US006494704B1

(12) United States Patent
Andersen et al.

(10) Patent No.: US 6,494,704 B1
(45) Date of Patent: Dec. 17, 2002

(54) MOLD APPARATUS

(75) Inventors: Per Just Andersen, Santa Barbara, CA (US); Amitabha Kumar, Goleta, CA (US); Sandeep Kumar, Santa Barbara, CA (US); Denise S. Miller, Ventura, CA (US); Simon K. Hodson, Santa Barbara, CA (US)

(73) Assignee: E. Khashoggi Industries, LLC, Santa Barbara, CA (US)

( * ) Notice: Subject to any disclaimer, the term of this patent is extended or adjusted under 35 U.S.C. 154(b) by 0 days.

(21) Appl. No.: 09/539,549

(22) Filed: Mar. 31, 2000

(51) Int. Cl.[7] .................. B29C 43/34; B29C 43/50
(52) U.S. Cl. ............... 425/258; 425/403.1; 425/812; 425/408; 425/412; 425/447
(58) Field of Search ................... 425/407, 408, 425/412, 420, 422, 812, 403.1, 450.1, 256, 258, 398, 440, 447; 264/297.8, 297.9

(56) References Cited

U.S. PATENT DOCUMENTS

| 3,375,791 | A | * | 4/1968 | Pakula .................. 425/412 |
| 3,377,662 | A | | 4/1968 | Fukushima .................. 18/38 |
| 3,518,091 | A | * | 6/1970 | Turner .................. 426/552 |
| 3,998,580 | A | | 12/1976 | Pfiffer .................. 425/407 |
| 4,402,659 | A | * | 9/1983 | Greenbaum .................. 425/408 |
| 4,509,909 | A | * | 4/1985 | Arends .................. 425/388 |
| 4,612,081 | A | | 9/1986 | Kasper et al. .................. 156/583.1 |
| 4,753,160 | A | | 6/1988 | Baird et al. .................. 100/93 |
| 4,900,609 | A | | 2/1990 | Arnold .................. 428/163 |
| 5,139,407 | A | | 8/1992 | Kim et al. .................. 425/174.8 E |
| 5,259,752 | A | | 11/1993 | Scolameiro et al. .................. 425/406 |
| 5,330,341 | A | | 7/1994 | Kemerer et al. .................. 425/144 |
| 5,376,320 | A | | 12/1994 | Tiefenbacher et al. .................. 264/50 |
| 5,458,477 | A | | 10/1995 | Kemerer et al. .................. 425/371 |
| 5,464,579 | A | | 11/1995 | Brown et al. .................. 264/297.2 |
| 5,505,599 | A | | 4/1996 | Kemerer et al. .................. 425/4 C |
| 5,545,450 | A | | 8/1996 | Andersen et al. .................. 428/34.5 |
| 5,558,015 | A | | 9/1996 | Miyashita et al. .................. 100/50 |
| 5,591,463 | A | * | 1/1997 | Padovani .................. 425/420 |
| 5,658,603 | A | | 8/1997 | Andersen et al. .................. 425/532 |
| 5,660,900 | A | | 8/1997 | Andersen et al. .................. 428/35.6 |
| 5,683,772 | A | | 11/1997 | Andersen et al. .................. 160/36.4 |
| 5,700,495 | A | | 12/1997 | Kemerer et al. .................. 425/190 |
| 5,705,203 | A | | 1/1998 | Andersen et al. .................. 425/407 |
| 5,725,891 | A | | 3/1998 | Reid, Jr. .................. 425/407 |
| 5,776,517 | A | | 7/1998 | Ciccone et al. .................. 425/168 |
| 5,786,003 | A | | 7/1998 | Debbia .................. 425/405.1 |
| 6,024,559 | A | * | 2/2000 | Coleman .................. 425/409 |

* cited by examiner

Primary Examiner—Jan H. Silbaugh
Assistant Examiner—Thu Khanh T. Nguyen
(74) Attorney, Agent, or Firm—Workman, Nydegger & Seeley

(57) ABSTRACT

Mold press apparatus for use in the manufacture of molded articles, particularly starch-bound containers and other articles. The mold press apparatus includes a planar array of female mold halves and a corresponding planar array of male mold halves. The planar array of mold halves remain substantially coplanar throughout the process of selectively mating and separating the male and female mold halves. When used to manufacture molded articles from aqueous starch-based compositions, the molds are equipped with venting means, such as vent holes and/or a vent gap, which allow for the escape of water vapor from the mold cavities defined by the mated male/female mold pairs. A suction removal system may be used to remove the molded articles from the mold press apparatus, typically from the female mold halves. The demolded articles are deposited on a conveyor system equipped with individual nests for each article.

20 Claims, 8 Drawing Sheets

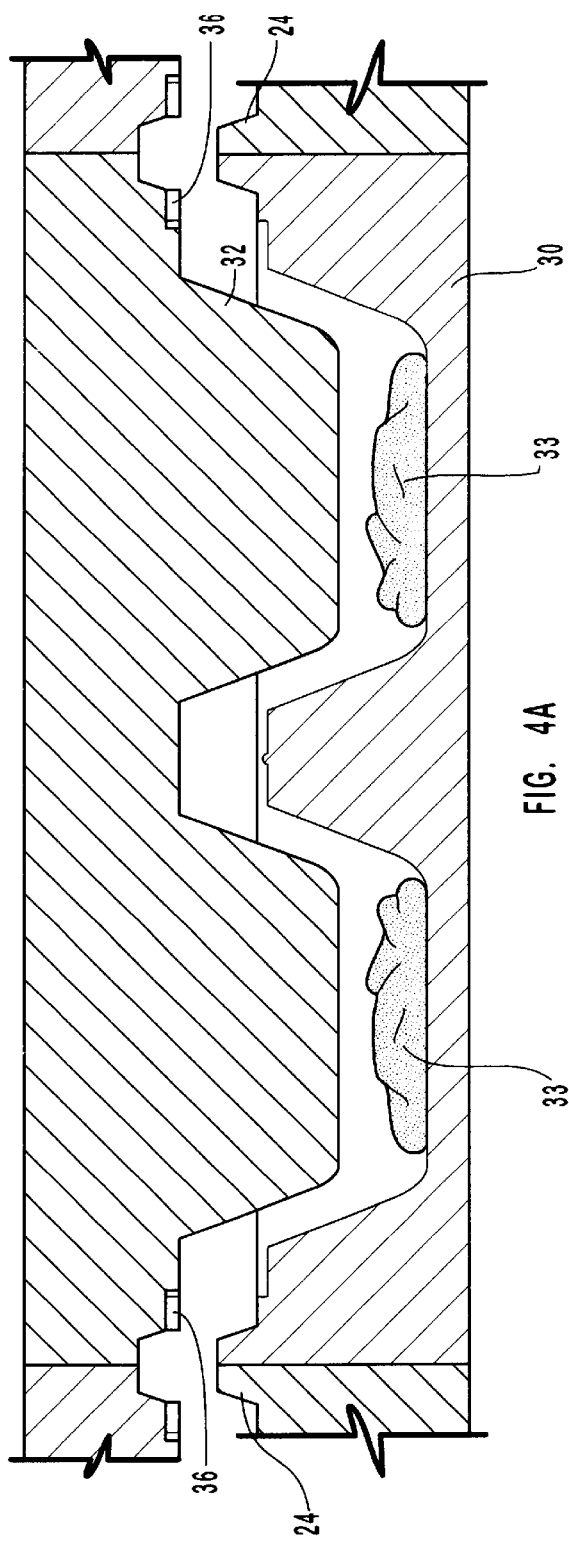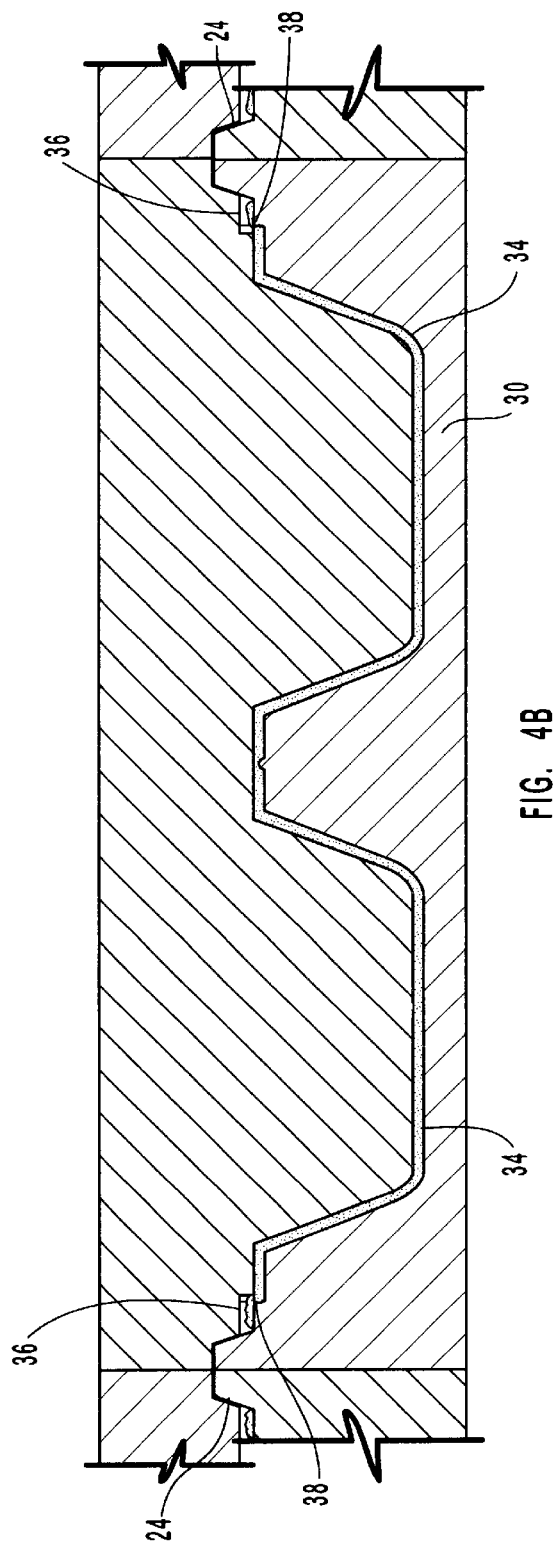

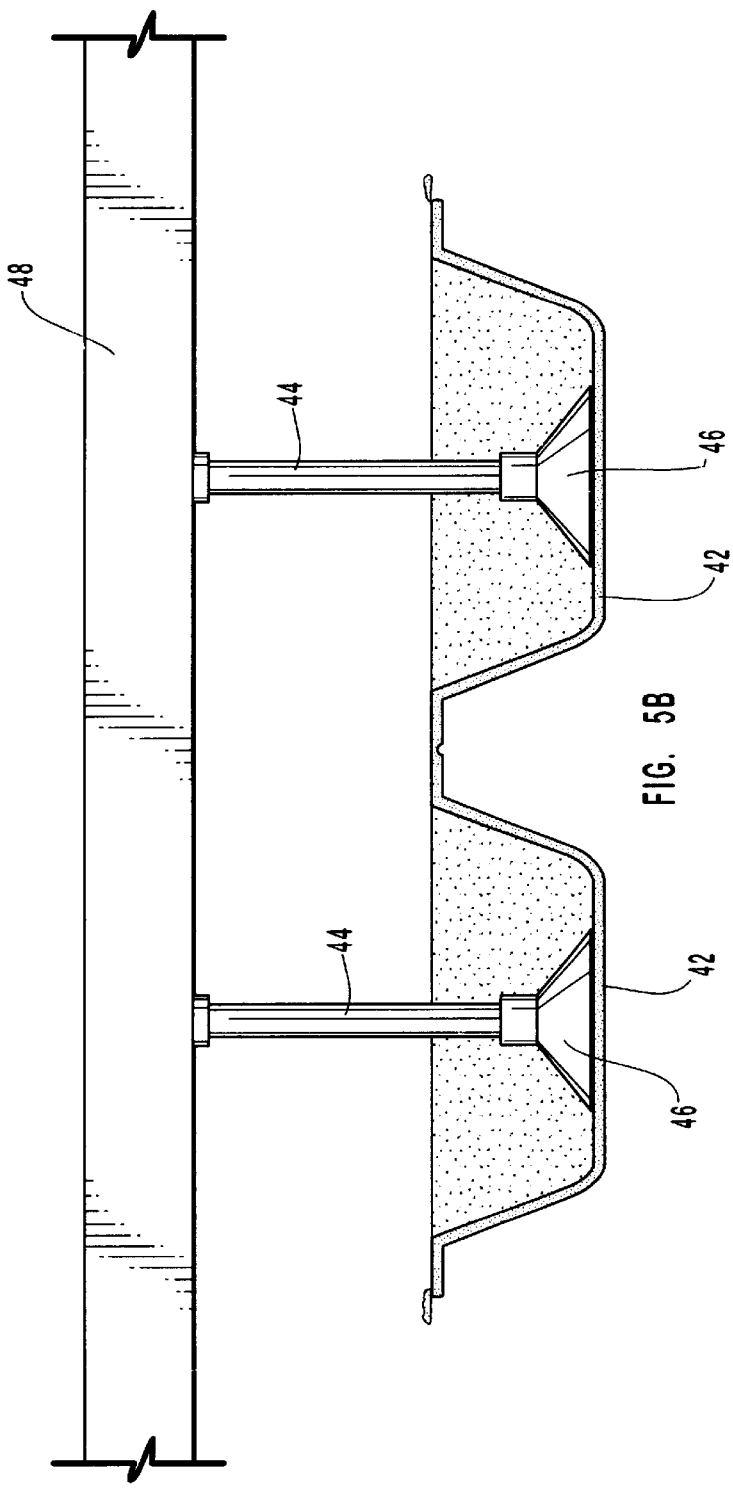
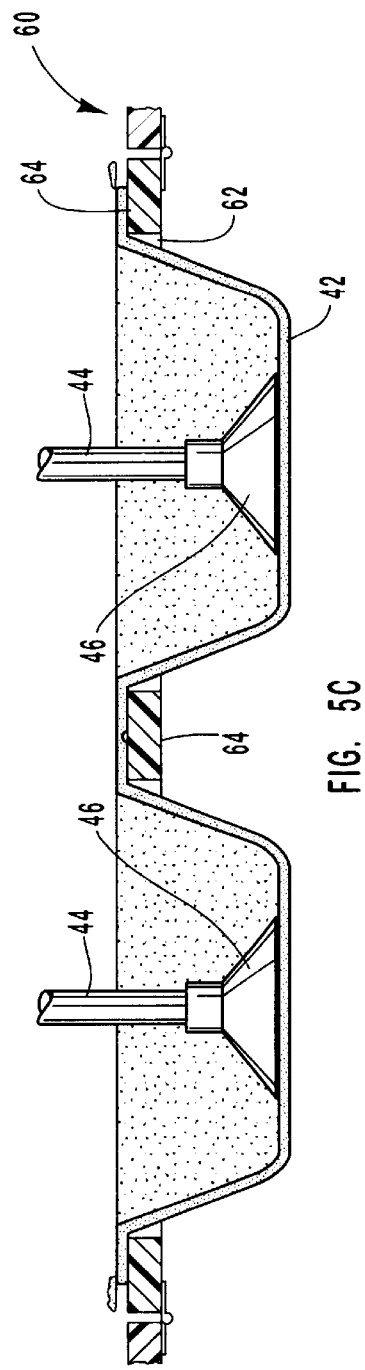
FIG. 5B
FIG. 5C

MOLD APPARATUS

BACKGROUND OF THE INVENTION

1. The Field of the Invention

The present invention relates to mold presses. More particularly, the present invention relates to mold systems whereby corresponding mold halves are reliably maintained in a desired X-Y orientation during the molding of articles, particularly starch-bound articles.

2. The Relevant Technology

There exists a large interest in the development of articles of manufacture that are more environmentally friendly than materials such as paper, paperboard, thermoplastics, polystyrene, glass, wood, and even metals. Environmentally friendly materials of recent interest include starch-based compositions that are foamed or expanded. Such compositions are beginning to make inroads into industries such as paper, plastic, polystyrene, etc, particularly in the field of disposable containers and other packaging materials.

The last several decades has seen the proliferation of disposable articles throughout industrialized nations. The convenience of single-use articles, the need for single-use sterile articles, and the need for disposable light weight and insulative materials have caused the increased use of polystyrene as a preferred container material. Polystyrene is now being manufactured and fabricated into single-use articles, and thereafter abandoned to the environment on a significant scale. Polystyrene has the qualities of sturdiness, light weight, thermal insulation, and containment of liquids among others. Unfortunately, polystyrene is entirely non biodegradable and, although it may be substantially inert to the environment, it along with other materials such as paper, wood, and metals constitute a significant fraction of municipal landfills. Additionally, polystyrene, if incinerated, can release significantly harmful toxins into the environment. In addition to being non biodegradable, polystyrene represents the consumption of the non-renewable resource of petroleum. Additionally, time between planting a tree and harvesting can amount to several years or decades.

A substitute for polystyrene foam has been found in a foamed cellular matrix made from starch that may contain fibers and fillers. One application of containers made of a starch-bound cellular matrix was seen at the Lillihammer Winter Olympic Games where biodegradable containers made by Biopac Corporation were introduced to the public. This technology is now assigned to E. Khashoggi Industries, LLC, of Santa Barbara, Calif. One drawback to these containers was that processing and materials costs were made too high for such containers to be uneconomical viable.

Researchers at EKI have developed improved compositions for manufacturing starch-bound containers that are far less expensive than those made by Biopac. Displacement of a portion of the starch with inexpensive inorganic mineral fillers together with fibers for reinforcement have greatly reduced both materials, as well as production, costs. The result is that such articles are less expensive and more economical to produce. In addition, such articles have far better strength and other mechanical properties, which allows for the manufacture and use of articles that have substantially smaller wall thicknesses.

Another drawback to the molding process as developed by Biopac was that the molding equipment consisted of modified baking molds used to manufacture food items such as waffles, cookies, edible containers and the like. Whereas such molding systems were adequate for molding relatively thick-walled food items and containers, such as those made by Biopac, such systems have proven to be problematic when used in the manufacture of articles having smaller wall thicknesses and stricter product tolerances. An exemplary mold apparatus known in the art for manufacturing bowls is illustrated in FIG. 1.

As seen in FIG. 1, a conventional mold apparatus includes paired male and female molds joined together by a hinge mechanism. The hinge allows the male mold half to be raised up relative to the female mold in order to allow the insertion of mold material therein. Thereafter, the male mold is lowered into the female mold to yield a mated male-female mold pair having a mold cavity defined therebetween. However, hinged male and female mold pairs are prone to excessive variations in mold cavity dimensions such that maintaining a consistent mold cavity throughout an iterative molding process has proven to be quite difficult.

One problem involves the hinge. In order to provide the function of allowing the male mold to open and close relative to the female mold the hinge necessarily allows some degree of motion between the two mold halves. The problem arises where there is significant lateral movement. Even slight deviations from the ideal mating arrangement can yield an uneven mold cavity. For example, where the desired wall thickness of a given article is 2 mm, movement of the male mold by an amount of even 0.5 mm can yield an actual mold cavity having a thickness of 2.5 mm on one side and only 1.5 mm on the other. Such uneven mating not only yields a product that is substantially deformed due to the uneven wall thickness, it may also prevent proper formation of the article in the first instance.

The molding of starch-based articles having a foamed cellular matrix involves rapid expansion of the mold material as a result of formation of internal water vapor as well as removal of the water by evaporation to yield a solidified product. Because the rate of heat transfer is relatively constant between the mold and the mold material, deviations in wall thickness can greatly affect the rate at which a particular portion of the article solidifies or cures. More specifically, areas where the mold cavity is thicker than intended can yield an area of under cured material such that portion of the article upon demolding may be too soft or inadequately formed. On the other hand, overheating the article such as by leaving the article within the mold for longer than is optimal can scorch or burn the article. Thus, areas where the mold cavity is too thin compared to what is optimal may cause burning or scorching of that portion of the molded article. In view of this, the importance of properly mating the female and male molds to yield a substantially uniform mold cavity becomes readily apparent.

In addition to unwanted lateral movement between the male and female mold halves due to the hinge mechanism, which is only exacerbated as the hinge undergoes wear and tear, the mold halves can become misaligned due to fluctuations in mold temperature. It is well known that metals such as aluminum or steel used in many mold systems undergo significant expansion or contraction in response to fluctuations in temperature. Thus, heating the hinged mold apparatus depicted in FIG. 1 can cause mold misalignment due to uneven thermal expansion of the molds, particularly where the molds have varying thickness. Of course it is possible to make adjustments to the molds in order to offset the effects of thermal expansion. However, such adjustments are only feasible while the mold apparatus are not in use and the molds are sufficiently cool so as to avoid injury. Thus, such adjustments are often difficult to make and can cause significant downtime and cost in the overall manufacturing process.

It would therefore be an improvement in the art to provide mold apparatus and systems for maintaining accurate X-Y orientation between the mold halves and which overcame other problems associated with prior art mold apparatus.

It would also be an improvement in the art to provide mold apparatus and systems for molding starch-bound compositions that maintained a sufficient dimension variation tolerance and which avoided the problems associated with molding starch-bound articles having disparate wall thicknesses.

It would be a great improvement in the art to provide mold apparatus and systems that could repetitively and reliably form foamed starch-bound articles while avoiding both under curing and over curing of the starch-based compositions used to manufacture such articles.

It would also be a significant improvement in the art to provide mold apparatus and systems that consistently defined a desired mold cavity and which resisted dimensional fluctuations due to temperature variations through which the mold apparatus must cycle during the molding process.

Another improvement in the art would be to provide mold apparatus and systems that significantly eliminated the necessity of making individual mold cavity adjustments on a regular basis.

Such apparatus and methods for maintaining a desired mold cavity are disclosed and claimed herein.

SUMMARY AND OBJECTS OF THE INVENTION

The present invention encompasses apparatus and systems for molding articles of manufacture. Such apparatus and systems are configured so as to more accurately and precisely maintain proper alignment between an array of corresponding male and female mold halves, thereby better maintaining the dimensional integrity of the mold cavities defined by the male and female mold halves. This results in the ability to more consistently mold articles of manufacture having closely controlled dimensional tolerances. The inventive apparatus and systems are particularly well-suited for the manufacture of molded articles from aqueous compositions which solidify as a substantial portion of the water is driven off by evaporation. Examples of aqueous compositions suitable for use in combination with the inventive apparatus and systems are aqueous starch-based compositions.

In general, the mold apparatus used in the inventive systems comprises a plurality of male and female molds mounted in a pair of two-dimensional planar arrays, with the female molds occupying a first planar array and the male molds occupying a second planar array. The male and female molds within their respective planar arrays are configured and oriented so that the male and female molds will mate to form an array of desired mold cavities. By means of the first and second planar arrays of adjacent molds, the possible degrees of freedom of the various molds are greatly reduced.

The inventive mold press apparatus do not utilize hinged male and female mold pairs. Elimination of the hinges greatly reduces mold misalignment inherent in hinged mold pairs. In addition, the molds within the mold arrays preferably make abutting contact with each other, thereby reducing the tendency of individual molds to slip out of adjustment. The array or grid of molds causes the individual molds to essentially interlock so as to create a plurality of fixed mold halves with little or no freedom to move or slip.

In addition to, or instead of, the molds making abutting contact, the corresponding male and female molds can have interlocking features which ensure proper mating and a reproducible mold cavity. This allows the molds to be self-adjusting.

The foregoing features of the inventive mold apparatus ensure more uniform and reproducible wall thicknesses of the molded articles. More particularly, minimizing fluctuations in the size and configuration of the mold cavities ensures predictable and uniform wall thicknesses during numerous iterations of the molding process. This, in turn, helps to ensure the proper baking time in order to yield molded articles in which the article as a whole has been adequately, but not overly, baked or heated within the mold. Maintaining proper wall thicknesses allows the technician to select a baking time and temperature that will ensure adequate harding of the starting composition while avoiding charring or burning of the starch binder and other heat-sensitive components.

In a preferred embodiment of the present invention the male and female mold arrays are arranged in a parallel-planar orientation. In this embodiment, the arrays of molds male and female comprise rectilinear arrayed structures that are fastened or aligned together to make a substantially larger composite rectilinear structure. Each of the structures may comprise a series of one-, two- or multi-compartment molds for manufacturing one-piece, hinged two-piece, or multi-pieced articles. Maintaining proper X-Y alignment between the male and female molds in especially important when attempting to mold two-piece and multi-piece articles of manufacture.

Examples of one-piece articles include plates, bowls, trays and boxes. An example of a hinged two-piece article is a "clam-shell" sandwich or burger container. An example of the hinged three-piece article is duel hinged claim-shell container. An example of a multiz piece article is a box or other container with a lid or top.

In a preferred embodiment, the mold apparatus will be adapted for use in molding articles from aqueous starch-based compositions. Examples of starch-based compositions and methods for molding such compositions into useful starch-bound articles of manufacture are set forth more fully in U.S. Pat. No. 5,618,341; 5,660,900; 5,662,731; 5,679, 145; 5,683,772; 5,705,203; 5,709,827; 5,776,388; 5,783, 126; 5,843,544; and 5,868,824. The foregoing patents are presently assigned to E. Khashoggi Industries, LLC, located in Santa Barbara, Calif. For purposes of disclosure, the foregoing patents are incorporated herein by specific reference.

Starch-based compositions typically including water, ungelatinized and/or pregelatinized starch, fibers, an inorganic filler and optional components such as a mold release agent. During the molding process, the heated molds preferably cause a sudden increase in the temperature of the aqueous starch-based compositions. This causes the initially ungelatinized starch granules to become gelatinized while also causing a buildup of pressure within the mold cavity due to the formation of water vapor.

In a preferred embodiment, the mold apparatus according to the present invention will include venting means for allowing a controlled amount of water vapor to escape from the individual molds during the heated molding process.

Allowing only a controlled rate of water vapor release provides for a desired level of internal pressure buildup within the mold cavity, which assists in causing or allowing the starch-based composition to expand and fill the mold cavity. The venting means will typically include one or more vent holes and/or a venting ring at or near the interface of the male and female molds. The vent holes and/or venting ring should be oriented so as to ensure that the entire mold cavity is filled during the molding process. Otherwise, localized buildups in pressure could cause certain sectors of the mold cavity to resist being filled by the expanding mold composition.

It is therefore an object of the invention to provide mold apparatus and systems for maintaining accurate X-Y orientation between the mold halves and which overcome other problems associated with prior art mold designs.

It is also an object and feature of the invention to provide mold apparatus and systems for molding starch-bound compositions that maintain a sufficient dimension variation tolerance and which avoid the problems associated with molding starch-bound articles having disparate wall thicknesses.

It is a further object to provide mold apparatus and systems that can repetitively and reliably form foamed starch-bound articles while avoiding both under curing and over curing of the starch-based compositions used to manufacture such articles.

It is another object to provide mold apparatus and systems that consistently define a desired mold cavity and which resist dimensional fluctuations due to temperature variations through which the mold apparatus must cycle during the molding process.

It is yet another object and feature of the invention to provide mold apparatus and systems that significantly eliminate the necessity of making individual mold cavity adjustments on a regular basis.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which:

FIG. 4A is a side cross-section view of the male and female mold halves depicted in FIG. 3 in a partially mated configuration and with a blob of an initially flowable mold material within each depression of the female mold half.

FIG. 4B is a side cross-section view of the male and female mold halves depicted in FIG. 4A in a completely mated configuration so as to define a mold cavity corresponding to a desired shape of an article, with the mold material completely filling the mold cavity.

FIG. 5B depicts the suction removal system of FIG. 5A after having completely withdrawn the molded article from the female mold half depicted in FIG. 4C.

FIG. 5C depicts the suction removal system of FIG. 5B placing the molded article within the nests of a conveyor system, which are depicted in cross-section.

DETAILED DESCRIPTION OF THE PREFERRED EMBODIMENTS

I. Introduction

Figure 1:
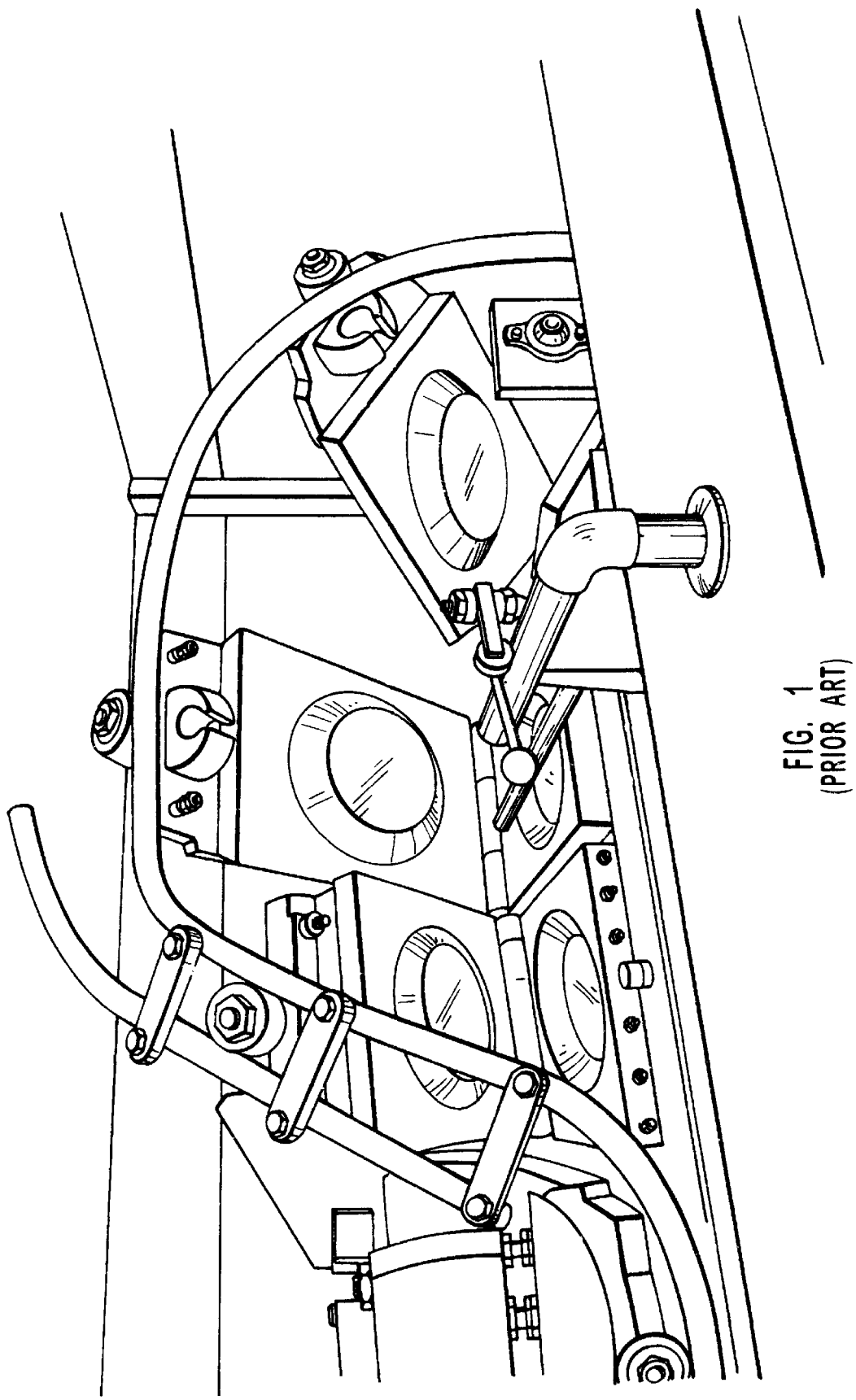
FIG. 1 is a perspective view of a prior art hinged mold apparatus.

The present is directed to apparatus and systems for molding articles of manufacture. Because the apparatus and systems maintain proper alignment between the corresponding male and female mold halves, they better maintain the dimensional integrity of the mold cavity defined by the male and female mold halves. This allows for the ability to mold articles having more closely controlled dimensional tolerances. Such mold apparatus and systems are particularly well-suited for the manufacture of molded containers and other articles from aqueous starch-based compositions which solidify by evaporating off a substantial portion of the water. This is accomplished by using heated molds having venting means, such as vent holes or a vent gap.

The inventive mold press apparatus include a planar array of female mold halves and a complimentary planar array of male mold halves. After inserting a desired molding material within the female mold halves, the mold halves are brought together in a mating arrangement by means of at least one movable platen to which the male mold halves and/or the female mold halves are attached. In one embodiment, one of the platens to which the male or female mold halves are attached remains stationary.

The female mold array comprises a plurality of female mold halves that are secured to an underlying platen and which are in abutting contact with each other. The male mold array is typically suspended above the female mold array and comprises a plurality of male mold halves that are secured to an overlying platen and which are in abutting contact with each other. In this manner, mold material can be advantageously deposited into the female molds, which, by virtue of their having a depression therein, will reliably hold the mold material therewithin pending mating with the male mold halves.

Because the mold halves make abutting contact with each other, they are essentially interlocked within a desired X-Y orientation on their respective platens. This, in turn, ensures that a desired mold cavity will be formed each time the male and female molds are brought together in a mating position. The abutting contact reduces the tendency of molds to shift during continued mold press operation, such as due to heat expansion or mechanical disturbance.

After a sufficient amount of water has been removed by evaporation from the aqueous mold material so as to yield form stable articles of manufacture, the articles are removed from the mold. This is accomplished by first separating the male and female mold halves, such as by moving one platen of mold halves away from the other platen of mold halves. In one embodiment, the molds are configured so that the molded articles remain within the female mold halves upon separating the mold halves. The molded articles are advantageously removed from the female mold halves by means of a suction removal system and placed on a conveyor for further processing. In one embodiment, the conveyor includes individual nests, or specially sized openings, into which the demolded articles are placed. In this manner, the demolded articles are maintained in a desired location along the conveyor during further processing.

II. Mold Press and Related Apparatus

Figure 2:
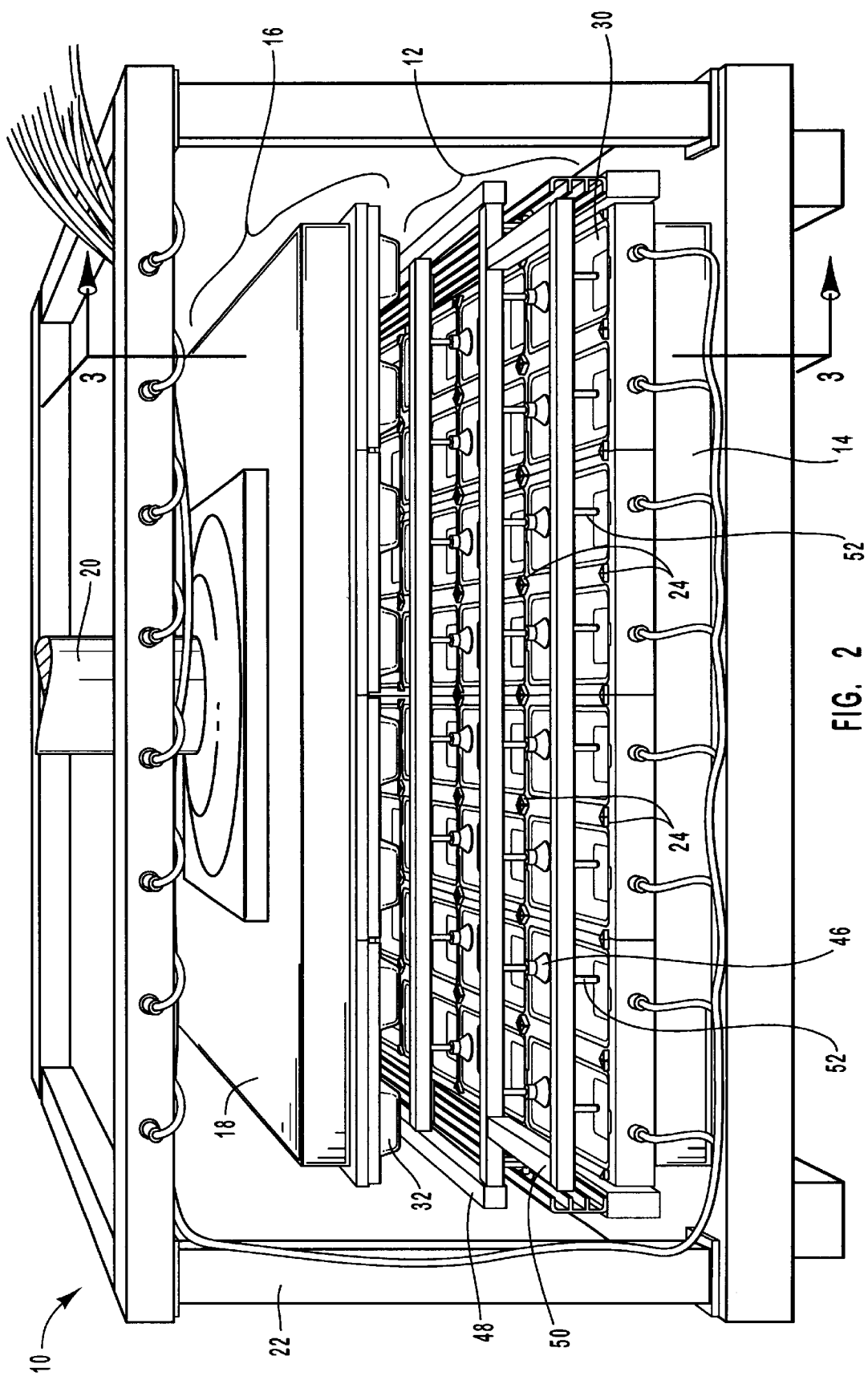
FIG. 2 is a perspective view of the inventive mold press apparatus, in an open position, including a planar array of male molds and a corresponding planar array of female molds.
Figure 3:
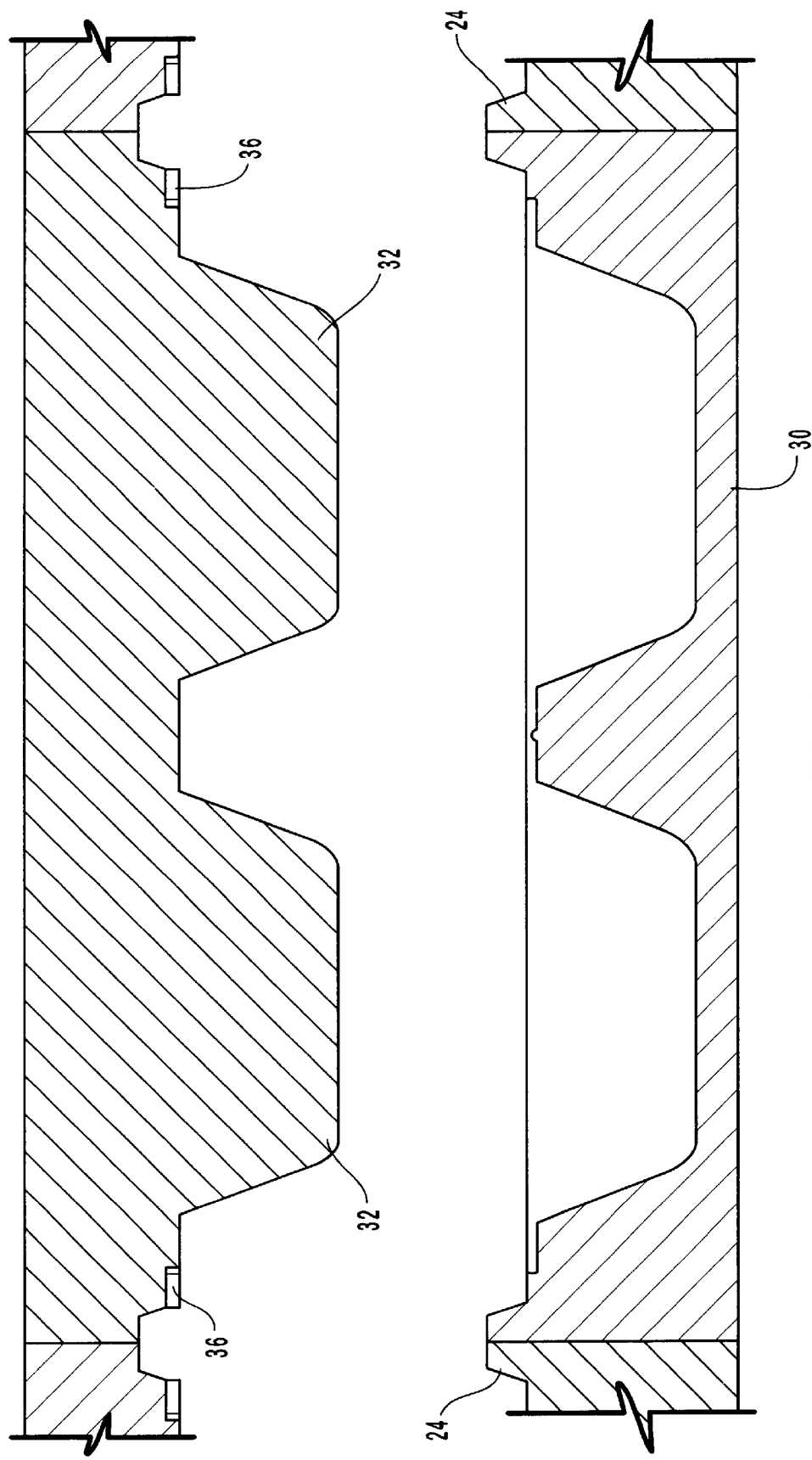
FIG. 3 is a side cross-section view taken along line 3—3 of FIG. 2 depicting a pair of corresponding male and female mold halves in an open configuration.
Figure 4C:
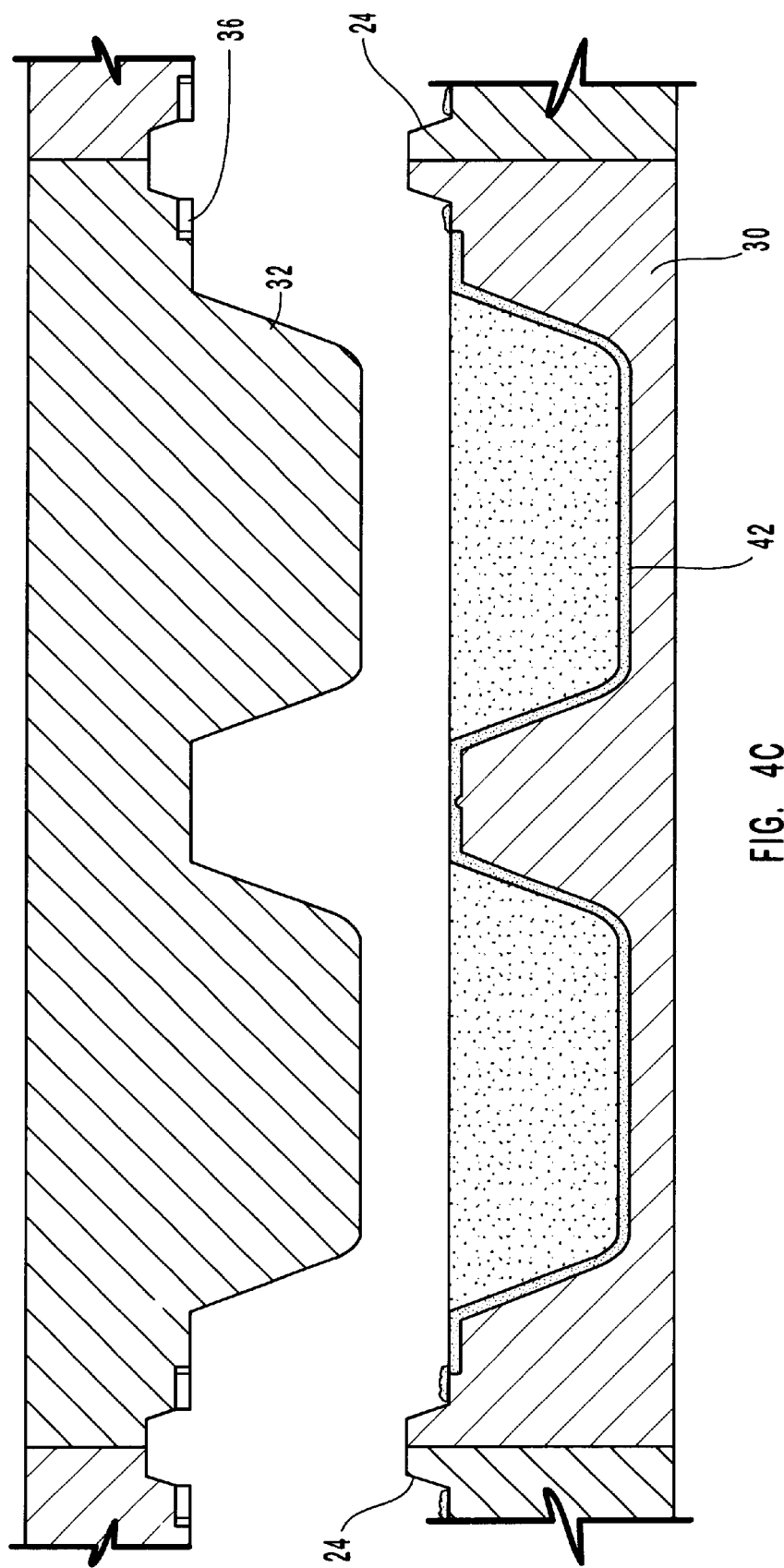
FIG. 4C is a side cross-section view of the male and female mold halves of FIG. 4B in a partially separated configuration, with a molded article remaining within the female mold half.

An exemplary mold press apparatus used to manufacture molded articles according to the present invention is illustrated in FIG. 2. As more particularly depicted in FIG. 2, a mold press apparatus 10 includes a planar array of female mold halves 12 connected to a lower platen 14. The female mold halves 12 are each individually secured to the lower platen 14 by means of mold securing means (not shown), such as bolts that are screwed into the platen 14. The female mold halves 12 also make abutting contact with each other in order to reduce or eliminate relative movement of the female mold halves 12 in relation to the lower platen 14.

The mold press apparatus 10 further includes a corresponding planar array of male mold halves 16 connected to an upper platen 18. The male mold halves 16 are each individually secured to the upper platen 18 by means of mold securing means (not shown), such as bolts that are screwed into the platen 18. The male mold halves 16 also make abutting contact with each other in order to reduce or eliminate relative movement of the male mold halves 16 in relation to the upper platen 18.

The mold press apparatus 10 depicted in FIG. 2 includes mold halves that are configured and oriented so as to define mold cavities corresponding to a clam shell sandwich container when deployed. As such, each of the mold cavities includes a pair of subcavities corresponding to the bottom and top halves of the clamshell container, respectively, with a hinge portion bridging the two container halves. A more detailed description of exemplary mold apparatus for manufacturing hinged clam shell containers is set forth in U.S. Pat. No. 5,705,203, which is incorporated herein by specific reference. Because the clam shell containers are essentially made up of two equally sized square shaped openings, the molds to manufacture such containers are approximately twice as long as they are wide. Thus, the mold press apparatus 10 includes a two-dimensional array of 8 mold halves across in one direction (X direction) and 4 molds deep in the other direction (Y direction), for a total of 32 mold cavities and 64 total mold halves.

It will be appreciated that it is within the scope of the invention to use a wide variety of differently shaped molds as well as a number of molds, both in absolute terms and in either the X and Y directions. By way of example and not limitation, the mold apparatus may be configured to manufacture, e.g., plates, bowls, cups, lids, trays, compartmented trays, boxes and the like. In addition, it is within the scope of the invention to mount the male mold halves on the lower platen and the female molds on the upper platen. It would also be within the scope of the invention to provide single or multiple monolithic mold halves (not shown) which include a plurality of female or male molds rather than individual molds mounted side-by-side as depicted in FIG. 2. The mold cavities may be configured to yield molded articles having a wall thickness in a range from about 0.1 mm to about 10 cm, preferably in a range of about 1 mm to about 1 cm.

As further depicted in FIG. 2, the upper platen 18, to which the male mold halves 16 in this embodiment, are mounted is able to rise up and down relative to the stationary lower platen 14, to which the female mold halves 12 are mounted, by means of an actuation rod 20. The actuation rod 20 may be driven by any means known in the art for moving a particular mechanical feature relative to another mechanical feature. An example is an air-driven, or pneumatically actuated, piston. Another is a hydraulically actuated piston. The only requirement is that the actuation means be capable of bringing the male and female mold halves into a mated orientation during molding of a desired article and also separating the mold halves in order to demold the articles and reload the molds with fresh molding material.

In order to maintain perfect alignment of the upper platen 18 and lower platen 14, stabilizing bars 22 are provided. In this manner, once the mold halves have been mounted to a respective platen they will remain aligned so as to maintain a desired mating relationship between the mold halves. In addition, the molds are equipped with mold guides 24 or other interlocking or matable features (not shown) that help to maintain proper alignment during molding and/or which provide a visual guide to a technician during adjustment.

The male and female molds are preferably made of conductive metals such as steel, brass, and aluminum. Polished metals, including chrome and nickel, along with TEFLON (polytetrafluoroethylene) coatings, can be applied to the surface of the molds in order to reduce sticking and thereby make it easier to remove the molded articles from the molds and also to create a smoother finish.

When in use, the male and female molds are heated to a desired temperature or range of temperatures suitable for curing or drying the particular molding material being employed to manufacture molded articles. In the case where an aqueous molding material is solidified by evaporating at least a portion of the water therefrom, the molds will generally be heated to a temperature greater than about 100° C. The actual temperature is mainly determined by the desired solidification speed as well as the relative decomposition temperatures of the components within the molding material. For example, certain starches will scorch or burn at temperatures above about 250° C., and may experience chain degradation at lower temperatures. Nevertheless, the internal cooling effect of the evaporating water as it leaves the mold allows for mold temperatures above the decomposition or degradation temperatures of the components. Accordingly, the molds may be heated to a temperature in a range of about 80° C. to about 300° C., preferably in a range of about 120° C. to about 250° C., and most preferably in a range of about 170° C. to about 220° C.

The molds can be heated in a variety of ways. For example, external heating elements (not shown), such as gas burners, infrared light, and electrical heating elements, can be attached or directed at the molds. Alternatively, heated liquids (not shown), such as oils or heated gases, such as steam, can be piped through the molds to heat them. Various types of heating can also be used to vary the temperature of the molds along the length of the molds in order to vary the properties of the hardened matrix within the molded article. It is also possible to heat the mixtures without actually heating the molds. For example, the molds can be made out of ceramic and microwaves can be applied to heat the mixture.

By varying the temperature and processing time it is possible to affect the density, porosity, and thickness of the surface layer, or skin. In general, lowering the molding temperature yields molded articles having a thinner but more dense surface layer. A similar effect may be possible by restricting the venting capacity of the molds, which slows down the rate of evaporation and increases the internal pressure within the molds, or by increasing the viscosity and yield stress of the molding mixture. The yield stress and viscosity of the mixture can be increased by, e.g., reducing the water content and/or increasing the concentration of the thickening agent and/or using an inorganic filler having a higher specific surface area.

In some cases it may be desirable to vary the temperature at various points or regions within the molds in order to unevenly heat the article. This may be desired, e.g., where it is desired to manufacture articles of varying wall thickness or density. In general, increasing the mold temperature increases the rate of evaporation of the water from the moldable mixture as it is formed into a desired article. Increasing the wall thickness increases the time it takes to create a form stable article. Where the desired article will have greatly varying wall thicknesses throughout the article it may be advantageous to offset the tendency of the thicker-walled portions to harden more slowly than the thinner-walled portions by increasing the temperature of the mold at the location of increased thickness, thereby increasing the rate of evaporation of water at that location.

One of the purposes of using heated molds is to drive off the water from the mold material by evaporation. Another is to at least partially gelatinize any ungelatinized starch within the molding mixture. In order to allow for the removal of water by evaporation from the heated molding mixture the mold apparatus is preferably equipped with means for venting the mold cavity. The venting means may, for example, comprise one or more vent holes, a venting ring or gap, or a combination of the two. The vent holes are normally located at or near the interface between the male and female mold halves are advantageously spaced at strategic intervals in order to provide a desired "draw" or flow pattern of the molding material as it expands or otherwise flows to fill the mold cavity. The molding material will typically flow from an area of increased pressure to one or more areas of reduced pressure. The vent holes naturally provide a localized area or point of reduced pressure since they usually vent directly into the atmosphere.

FIGS. 3 and 4A–C depict a male/female mold pair configured to manufacture cups which also includes venting means. In particular, the mold pair includes a female mold 30 and a corresponding male mold 32, which, when mated, define a mold cavity 34 therewithin in the shape of a clam-shell sandwich container, as more readily seen in FIG. 4B. Of course, the mold cavity may correspond to virtually any desired article of manufacture or shape. The mold guides 24 assist in maintaining the proper orientation between the male mold 32 and the female mold 30.

At the interface between the female mold 30 and the male mold 32 are a plurality of vent holes 36 through which pent up water vapor can escape during molding. Of course, a portion of the molding material is typically expelled from the vent holes 36 as well. In addition, as more clearly depicted in FIG. 4B, a slight gap between the molds, or venting ring 38, at or near the circumferential edge of the molded article, provides additional venting capacity for the pent up water vapor during molding. One of ordinary skill in the art will be able to optimize the number and size of the vent holes and/or the size of the venting ring, if included at all, in order to optimize the molding process for a particular molding material and mold temperature.

Overly large vent holes may create noticeable deformities on the surface of the molded articles where excess material that has flashed through the vent holes must be removed. The size of the deformities can therefore be reduced by decreasing the size of the vent holes and optionally increasing the number thereof where a preferred total vent hole to surface area ratio is maintained within a mold cavity. Smaller vent holes cause a greater expansion force within the starch-containing mold material during heating. Thus, smaller vent holes facilitate more complete expansion of the starch-containing mold material to form the starch-bound cellular matrix.

In one embodiment, as depicted in FIG. 4A, a blob of an initially flowable mold material 33 is placed within each interior depression within the female mold 30. The mold material may be placed within the female mold 30 using any depositing means known in the art, such as by charging nozzles 52 (FIG. 2), to be discussed more fully hereinbelow. Upon closing the molds, as seen in FIG. 4B, the mold material 33 flows in order to completely fill the mold cavity 34. The internal buildup of water vapor resulting from the heating of the aqueous mold material 33 by the heated mold halves 30, 32 causes rapid flow of the mold material 33 throughout the mold cavity 34 and toward the vent holes 36 and venting ring 38. As the water vaporizes, which in turn causes the mold material to expand, both water vapor and excess mold material 33 are expelled through the vent holes 36 and venting ring 38.

As the water is driven off from the molding composition, the water-dispersible organic polymer binder, typically including starch, will tend to become at least partially solidified. At some point enough of the water is removed so that the mold material 33 yields a molded article 42 that is "form stable", ie., able to support its own weight against the force of gravity when removed from the mold and to resist undesired deformation during subsequent handling. The time in which a molded article 42 becomes form stable is a function of many factors, including the wall thickness, the initial water concentration of the molding material, the temperature of the molding apparatus, the venting capacity of the venting means, and the like. In general, the molding apparatus according to the invention will yield form stable molded articles in a time period of about 1 second to about 10 minutes, preferably in a range from about 10 seconds to about 2 minutes, more preferably in a range from about 30 seconds to about 2 minutes.

Once the molded article 42 has achieved a desired level of form stability, the male and female mold halves 30, 32 are separated (FIG. 4C) and the molded article 42 is removed using any demolding means known in the art of molding. One example of a suitable demolding means is depicted in FIGS. 2 and 5A–C. FIGS. 2 and 5A–C illustrate a suction removal system in which a plurality of molded articles 42 are removed by suction removal nozzles 44 to which are attached individual suction cups 46.

Figure 5A:
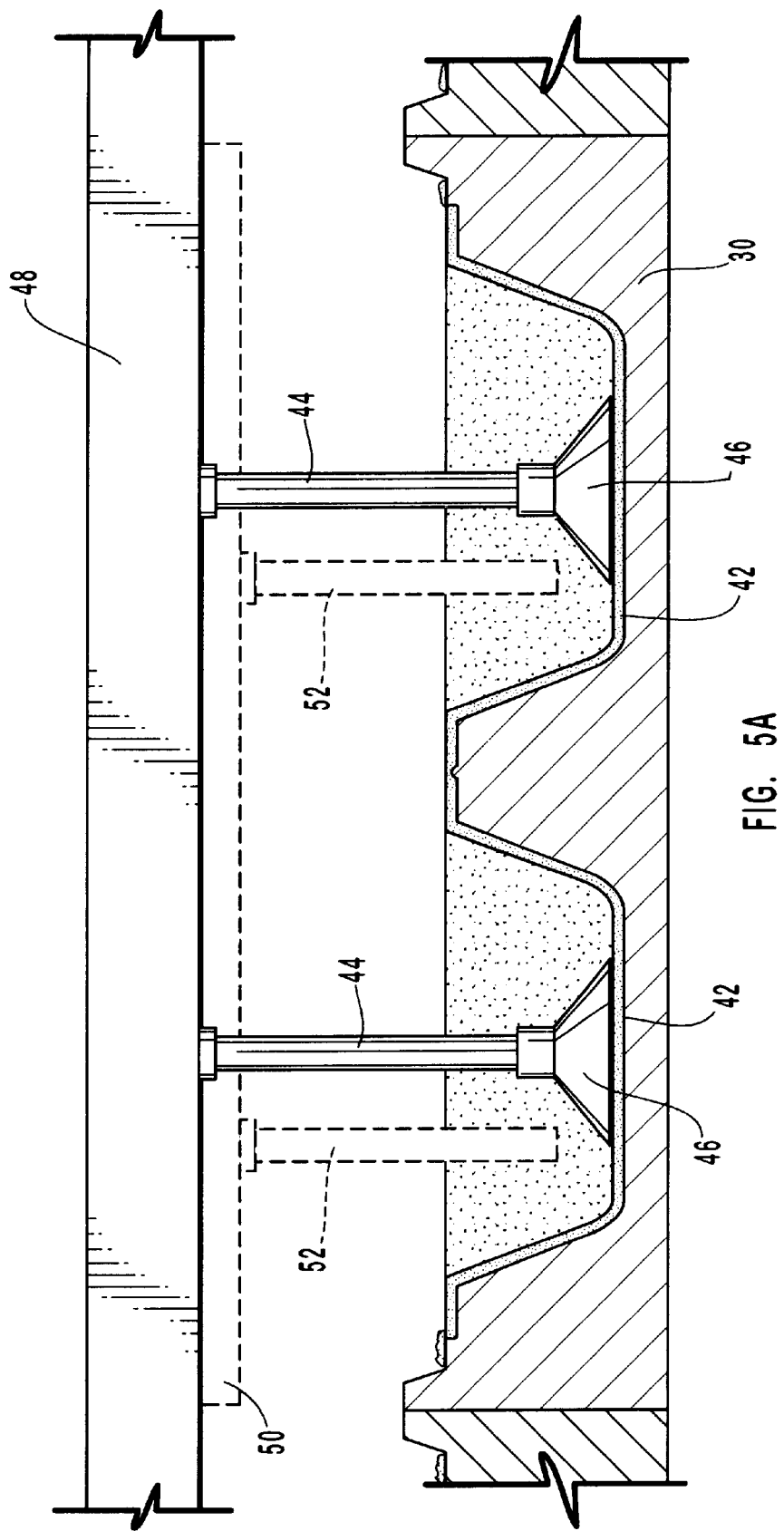
FIG. 5A depicts a suction removal system in the process of engaging the molded article from with the female mold half depicted in FIG. 4C.
Figure 6:
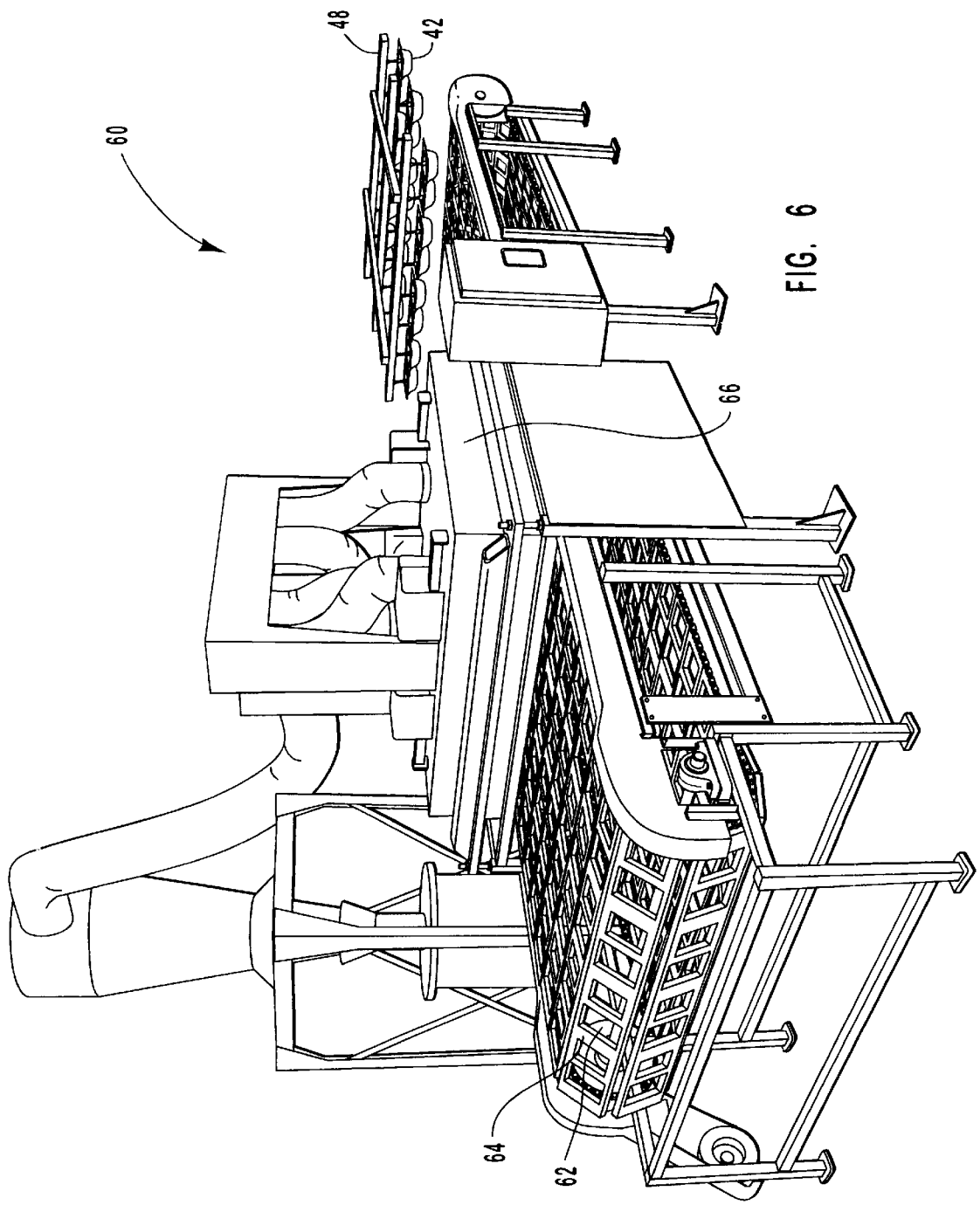
FIG. 6 is a perspective view of a conveyor system having an array of nests for conveying the molded articles from the mold press apparatus for further processing downstream.

As more particularly depicted in FIG. 5A, the suction cups 46 make abutting contact with each molded article 42 in order to create a suction interface therebetween. In order to provide synchronous removal of a plurality of molded articles 42, the suction removal nozzles 44 are connected to a moveable carriage 48. The carriage 48 allows the suction removal nozzles 44 and cups 46 to first engage and remove the molded articles 42 from the mold apparatus, typically the female mold halves 30, and then carry the demolded articles 42 out and away from the mold apparatus 10 for further processing (FIGS. 5B–C and 6). This also allows the mold apparatus 10 to be recharged with fresh molding material 33 in order to mold articles 42 on a continuous basis.

Each of the female mold halves 30 may be recharged by means of a depositing system 50 connected to, and part of, the moveable carriage 48 (FIGS. 2 and 5A). The depositing system 50 includes a plurality of charging nozzles 52 which inject or insert a predetermined quantity of the molding material 33 into the cavity or depression of each of the female mold halves 30. As the suction removal nozzles 44 and cups 46 carry the demolded articles 42 away from the mold press apparatus 10, the charging nozzles 52 are able to charge each row of female mold halves 30 as they pass over each female mold half 30. In this way, the processes of demolding and recharging the molds can be carried out simultaneously so as to maximize efficiency of the molding process.

Once the molded articles 42 have been removed from the mold apparatus 10 by the demolding means, they may be transported to one or more post-treatment stations as desired in order to finish the demolded articles. These may include, for example, a trimming system for removing any flashing that may be attached to the demolded articles, a coating system for applying an appropriate coating material, a printing system for applying a desired indicia, one or more accumulation systems for stacking or otherwise condensing the molded containers for packaging or further processing, and a packaging system for accumulating and boxing the articles for shipment.

In order to transport the molded articles 42, any appropriate conveying means known in the art of molding may be employed. One example of an appropriate conveying means is depicted in FIG. 6. FIG. 6 illustrates a conveyor system 60 that includes a plurality of nests 62 into which the molded articles may be placed (FIG. 5C). The nests 62 may be a series of spaced-apart depressions or holes corresponding to the size of the molded articles and to the desired spacing between the molded articles during transport and subsequent post-formation treatment. The nests 62 include rims 64 which make abutting contact with a portion of the molded articles in order to support them and keep them from falling through the conveyor system 60 (FIG. 5C). The rims 64 are preferably made from a durable material, such as non stick plastic or TEFLON (polytetrafluoroethylene), in order to resist wear and also adhesion of dirt, debris or other foreign materials that could otherwise adulterate the molded article surface.

FIG. 6 also depicts a flashing removal system 66 which interfaces with the conveyor system 60 in order to remove flashing, which is the portion of the mold material 33 that is expelled out the vent holes 36 and venting ring 38 and that remains attached to the molded articles 42. The flashing removal system may comprise any flashing removal means known in the art. One presently preferred flashing removal system is described more fully in copending U.S. application Ser. No. 09/356,719. For purposes of disclosing flashing removal systems, the foregoing application is incorporated herein by reference.

III. Molding Materials and Compositions

Even though the inventive mold apparatus is not necessarily limited by the particular molding materials that are used to manufacture the desired articles, there are certain compositions that have been found to be especially suitable when used in combination with the inventive mold apparatus. The following is a general discussion of preferred aqueous starch-based compositions that may be used with the inventive mold press apparatus, including the identities, properties, and preferred proportions of each of the components that may be added to the starch-based compositions. The discussion also includes a section on how each component affects the processing parameters, the properties of the moldable composition, and the properties of the final starch-bound articles.

A. Starch

The molding compositions used to manufacture starch-bound articles may advantageously include starch as the primary binder. Starch is inexpensive, readily available and a commonly used adhesive material with known properties. Starch acts as a binder through the formation of a starch gel and subsequent removal of water by evaporation from the starch gel. Starch is a natural carbohydrate chain comprising primarily condensed glucose molecules and is stored in plants in granular form.

In general, starch granules are insoluble in cold water and are gelatinized by raising the water temperature to above the gelatin temperature of the starch granules. When the starch granules are exposed to hot water, the granule walls soften, swell, and then burst to release the starch chains, which result in the gelation of the liquid fraction of the mixture. The exact temperature at which a particular starch granule swells and gelates depends on the type of starch it is. Corn starch, for example, gelates at a higher temperature than potato starch. Unmodified starch granules can be gelated in cold water if the outer membrane has been broken by, e.g., grinding the starch granules. Alternatively, starch can be chemically modified so that it will gelate in cold water. Gelated and hardened starch binds the individual filler particles and fibers within the composition that has been molded into the desired shape of the article.

Although starch is produced in many plants, an important source are seeds of cereal grains (e.g., corn, waxy corn, wheat, sorghum, rice, and waxy rice). Another important source includes tubers (such as potatoes), roots (such as tapioca, cassava, manioc, sweet potato, and arrowroot), and the pith of the sago palm.

The term "starch" includes both unmodified and modified starches. By "modified" it is meant that the starch has been derivatized or modified by typical processes known in the art such as, e.g., substitution, esterification, etherification, oxidation, acid hydrolysis, cross-linking, and enzyme conversion. Typical modified starches include esters, such as the acetate and the half-esters of dicarboxylic acids/anhydrides, particularly the alkenylsuccinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. Modified starches also include seagel, long-chain alkylstarches, dextrins, amine starches, and dialdehyde starches.

At least a portion of the starch within the molding composition is gelatinized in order to aid the dispersion of the components throughout the composition, particularly the fibers. In addition, the gelatinized starch fraction keeps the solid components from settling within the composition. The starch can be gelatinized by heating unmodified starch in the presence of water, or by adding a modified or pregelatinized starch to the aqueous composition.

Nevertheless, it may be desirable in some cases to maintain a portion of the starch in an ungelatinized, granular state. In its unmodified granular state, unmodified starches will not gelate in cold water and do not appreciably affect the rheology of the liquid fraction of the molding composition. Hence, unmodified starch can be included in significantly large amounts without greatly affecting the rheology of the molding composition since their primary effect on system rheology is as a particulate filler until the composition is heated during the molding process so as to gelatinize the initially ungelatinized starch granules. Once the starch-based composition has been properly positioned within the heated molds, the increased viscosity and green strength imparted by the newly gelatinized unmodified starch component is advantageous.

From a cost standpoint, it is advantageous that the majority of total starch comprises unmodified native starch granules, which are typically far less expensive compared to modified starches. In fact, unmodified starch granules derived from potato starch are very inexpensive and are often treated as a useless waste product. In some countries it is discarded or fed to cattle as a cheap feed material. Hence, the use of unmodified native starch provides a tremendous economic advantage over other materials and also provides a useful outlet for such previously discarded materials.

A preferred starch is potato starch, which quickly gelates and reaches a maximum viscosity and yield stress at about 65° C. The viscosity and yield stress of a mixture containing gelatinized potato starch and water then decreases as the temperature is raised further until water is evaporated, after which the viscosity and yield stress increase precipitously until the composition turns into a solid. Waxy corn starch acts in a similar fashion and is also preferred. Potato and waxy corn starch are also preferred because they swell and gelate easily in a single step. Of course, any starch that has similar swelling characteristics will be preferred to those that swell in two or more stages, although all starches are certainly within the scope of the invention.

B. Water.

Water is an important component within starch-based compositions used to mold starch-bound articles. Water allows the composition to be flowable and deformable and aids in the dispersion of the fibrous component throughout the starch-based composition. Water is important for overall molding composition rheology in order to obtain a composition that can be readily mixed, transported, and injected into the molding apparatus. Water is important in lubricating the solid particles, solvating the dissolvable or gelatable components, and in achieving a desired viscosity and yield stress of the composition. The water acts as a gelating agent that gelates the ungelatinized starch granules during mixing and/or during the heated molding process. The subsequent removal of water by evaporation from the starch causes it to solidify and bind the solid components together within the molded article. Finally, the water can act as an expansion agent in order to form an expanded cellular structural matrix.

Increasing the water content increases the number and size of the cells or voids in the structural matrix and lowers the density of the resulting article. In theory, the more water in a mixture, the more vapor that is produced, and thus, the more cells in the interior and the more pinholes in the surface that are formed. In contrast, using less water yields a more dense product having smaller cells.

The amount of water that is added to the molding compositions used to manufacture starch-bound articles will preferably be in a range from about 10% to about 80% by weight of the mixture, more preferably in a range from about 30% to about 70%, and most preferably in a range from about 40% to about 60% by weight of the mixture.

C. Fibers

The terms "fibers" and "fibrous materials" include both inorganic fibers and organic fibers. The use of fibers has been found to provide a number of useful benefits. Fibers serve to reinforce the structural matrix of the molded articles. More specifically, they serve to increase the cohesion of the partially hardened articles, giving them increased form stability; they also increase the elongation, deflection, toughness, fracture energy, flexural strength, and tensile strength of the finished articles. Certain fibers may also aid retaining small amounts of residual water within the newly molded articles. Such moisture can then diffuse back into the hardened starch-bound matrix, thereby imparting a softening effect.

It has been found that the greatest benefit occurs when fibers having a high aspect ratio and/or length are used. For best results, the fibers will preferably have an average aspect ratio greater than about 25:1, more preferably greater than about 100:1, and most preferably greater than about 250:1. Fibers will typically have an average length of at least about 0.3 mm, preferably at least about 1.5 mm, and more preferably greater than about 2 mm.

The desirable mechanical properties which are imparted by the fibers are most pronounced where the fibers enjoy a relatively high level of dispersion. More homogenous dispersion of the fibers results in far greater strength, toughness and fracture energy of the final molded article. It is also a more efficient use of the fibers, which tend to be more expensive than other components within the composition, such as the inorganic filler and starch. Poorly dispersed or clumped fibers may impart only slightly better mechanical properties compared to compositions in which no fibers are used at all. Poorly dispersed of clumped fibers may also yield molded articles having a more scarred and irregular outer surface. The use of significant quantities of pregelatinized starch or other thickening agent in the molding composition aids in the homogenous dispersion of fibers throughout the composition by transferring shear from the mixing apparatus down to the fiber level.

Preferred fibers include naturally occurring organic fibers, such as cellulosic fibers extracted from hemp, cotton, plant leaves, sisal, abaca, bagasse, wood (both hardwood or softwood, examples of which include southern hardwood and southern pine, respectively), or stems, husks, shells, and fruits. Less preferred but certainly within the scope of the invention are inorganic fibers made from glass, graphite, silica, ceramic, or metal materials, as well as synthetic organic polymer fibers. Even recycled paper fibers or cotton linters can be used within the scope of the invention, although their weaker condition usually necessitates the inclusion of more of such fibers to obtain the desired level of strength, all things being equal, compared to virgin cellulosic fibers.

The amount of fibers added to the molding composition will vary depending upon the desired properties of the final molded article and well as the strength of the fibers themselves. The tensile strength, toughness, flexibility, and cost are principle criteria for determining the amount of fiber to be added to the composition. The concentration of fibers will preferably be in a range from about 1% to about 50% by weight of the molding composition, more preferably from about 3% to about 30% by weight, and most preferably from about 5% to about 20% by weight of the molding composition.

D. Particulate Fillers

The term "particulate fillers", as used in the specification and the appended claims, includes both inorganic and inert organic filler particles but does not typically include fibers, except fibrous materials having very low aspect ratio and which impart little or no strengthening effect. In general, fillers do not strengthen the structural matrix, but are added in order to displace the more expensive components such as starch, fibers, mold release agent, and the like. Inorganic mineral fillers, however, generally increase the stiffness and modulus of elasticity of the articles, which is advantageous where a stiffer and more rigid article is desired. Such fillers also help the article resist mechanical deformation when exposed to changes in ambient moisture, such as within a molded container used to microwave food.

Inorganic materials commonly used in the paper industry, as well as more finely ground filler materials used in the concrete industry, may be used in the molding compositions. Examples of useful inorganic fillers include, but are not limited to, perlite, vermiculite, sand, gavel, rock, limestone, sandstone, glass beads, aerogel, xerogels, seagel, mica, clay, synthetic clay, alumina, silica, fly ash, fused silica, zeolites, tabular alumina, kaolin, microspheres, hollow glass spheres, porous ceramic spheres, gypsum (calcium sulfate dihydrate), calcium carbonate, calcium aluminate, lightweight polymers, xonotlite (a crystalline calcium silicate gel), lightweight expanded clays, hydrated or unhydrated hydraulic cement particles, pumice, exfoliated rock, and other geologic materials.

A dry-milled calcium carbonate is a preferred inorganic aggregate, since it can be obtained at one-third the cost of calcium carbonate obtained through wet-milling. A preferred calcium carbonate is R040, which has a particle size in a range from about 10 microns to about 150 microns, with an average particle size of about 42 microns, and a low specific surface area. Both clay and gypsum are useful filler materials because of their ready availability, extreme low cost, workability, ease of formation, and because they can also provide a degree of binding and strength if added in high enough amounts.

Examples of fillers which can add a lightweight characteristic and higher insulation to the molded articles include perlite, vermiculite, glass beads, hollow glass spheres, synthetic materials (e.g., porous ceramic spheres, tabular alumina, etc.), cork, pumice, plastic spheres, foamed polystyrene particles, and light-weight expanded clays, sand, gravel, rock, limestone, sandstone, and other geological materials.

The particulate filler may be included in amounts up to about 90% by weight of solids in the molding composition, preferably in a range from about 5% to about 80% by weight of solids in the starch-based composition, more preferably in a range from about 10% to about 70%, and most preferably in a range from about 20% to about 50% by weight. In the case where one or more lightweight fillers are included, such fillers will preferably be included in an amount in a range from about 5% to about 80% by volume of the total solids, more preferably in a range from about 10% to about 70% by volume, and most preferably in a range from about 20% to about 60% by volume of total solids.

E. Mold-Release Agents

To assist in demolding the newly formed articles, a mold-release agent may advantageously be added to the moldable composition. Preferred mold-release agents include medium- and long-chain fatty acids, their salts and their acid derivatives. More preferred mold-release agents include stearates, which have hydrophobic properties and are not soluble in water. Stearates are salts of stearic acid and have the general formula of $CH_3 (CH_2)_{16} COO^-X^+$, where $X^+$ is typically an ion of Al, Mg, Na, K, or Ca. Both magnesium and aluminum stearates are preferred mold release agents that have been approved by the FDA.

Silicones and silanes can also be used as mold releasing agents. Lecithin, which is a mixture of phosphatides and glycerides, can contribute to lessening of the stickiness of the molding composition, providing mold releasing properties, and can improve the flexibility of the formed articles. Various waxes, such as paraffin and bees wax, and TEFLON-based materials can also be used as mold-releasing agents. To further assist in releasing the articles from the molds, the molds. themselves can be polished, chrome plated, or coated with, e.g., nickel, Teflon, or any other material that limits the tendency of the articles to stick to the molds.

F. Optional Admixtures

The starch-based composition may optionally include other admixtures to change the rheology of the mixture and/or to improve the mechanical properties of the final molded product. Examples of useful rheology-modifying agents include polysaccharide gums, such as alginic acid, phycocolloids, agar, gum arabic, guar gum, locust bean gum, gum karaya, gum tragacanth, and mixtures thereof. A preferred gum is guar gum, which aids in preventing segregation of the fibers from the mixture. It also acts as a pumping aid by preventing aggregation or blockage of the fibers within the pump apparatus.

Other admixtures include humectants, plasticizers, cross-linking agents, water-proofing agents, internal coating materials, integral sealing materials, enzymes, additional binding agents, and the like.

IV. Post Formation Treatment of Molded Articles

The molded articles can be treated in a variety of different ways to improve the mechanical and/or chemical properties of the articles. For example, the surface of the starch-bound cellular matrix can be treated with a polyol, such as glycerin, preferably aqueous glycerin for increased penetrability. Glycerin acts as a plasticizer, humectant, and stabilizer for reducing warping when article is exposed changing ambient humidity. Aqueous coating materials, with or without glycerin, can have a conditioning effect as some or all of the water within such coatings is absorbed into the starch-bound structural matrix.

It is also within the scope of the present invention to apply coatings or coating materials to the articles. Coatings can be used to alter the surface characteristics of the articles in a number of ways, including sealing and protecting the article. Coatings may provide protection against moisture, bases, acids, grease, and organic solvents. They may also fill in voids on the surface of the article and provide a smoother, glossier, or scuff-resistant surface. Furthermore, coatings can help prevent aggregate and fiber "fly away". Coatings may also provide reflective, electrically conductive or insulative properties. They may even reinforce the article, particularly at a bend, fold, edge or corner. Coatings can be applied as a liquid or as a laminating film. Some coating are also useful as an adhesive.

Application of a coating may also be used to regulate the moisture content of the present articles. It is theorized that the moisture content of an article will eventually reach a point of equilibrium with its environment. That is, relatively dry articles will adsorb moisture in a humid climate and conditioned articles will loose moisture in a dry climate. The application of a coating after conditioning the article to the proper moisture content can prevent or at least slow down the exchange of moisture between article and the surrounding environment.

The object of the coating process is usually to achieve a uniform film with minimal defects on the surface of the article. Selection of a particular coating process depends on a number of substrate (i.e., article) variables, as well as coating formulation variables. The substrate variables include the strength, wettability, porosity, density, smoothness, and uniformity of the article. The coating formulation variables include total solids content, solvent base, surface tension, and rheology.

The coating can be applied either during the forming process or after the article is formed. The coating can be formed during the forming process by adding a coating material that has approximately the same melting temperature as the peak temperature of the mixture. As the mixture is heated, the coating material melts and moves with the vaporized solvent to the surface of the article where it coats the surface. Such coating materials include, for example, selected waxes and cross-linking agents.

The coatings may be applied to the article after formation by using any coating means known in the art of manufacturing paper, paperboard plastic, polystyrene, sheet metal, or other packaging materials, including blade, puddle, air-knife, printing, Dahlgren, gravure, and powder coating. Coatings may also be applied by spraying the article with any of the coating materials listed below or by dipping the article into a vat containing an appropriate coating material. The apparatus used for coating will depend on the shape of the article. For example, cups will usually be coated differently than flat plates.

In the case of applying the coating in the form of a thin film, a vacuum coating apparatus may be used. The porosity of the starch-bound cellular matrix can assist in drawing a vacuum therethrough in order to pull and adhere the coating film onto the surface of the molded article.

As the articles having a starch-based binder have a high affinity for water, the preferred coatings are non-aqueous and have a low polarity. Appropriate coatings include, for example, paraffin (synthetic wax); shellac; xylene-formaldehyde resins condensed with 4,4'-isopropylidenediphenolepichlorohydrin epoxy resins; drying oils; reconstituted oils from triglycerides or fatty acids from the drying oils to form esters with various glycols (butylene gylcol, ethylene glycol), sorbitol, and trimethylol ethane or propane; synthetic drying oils including polybutadiene resin; natural fossil resins including copal (tropical tree resins, fossil and modern), damar, elemi, gilsonite (a black, shiny asphaltitc, soluble in turpentine), glycol ester of damar, copal, elemi, and sandarac (a brittle, faintly aromatic translucent resin derived from the sandarac pine of Africa), shellac, Utah coal resin; rosins and rosin derivatives including rosin (gum rosin, tall oil rosin, and wood rosin), rosin esters formed by reaction with specific glycols or alcohols, rosin esters formed by reaction formaldehydes, and rosin salts (calcium resinate and zinc resinate); phenolic resins formed by reaction of phenols with formaldehyde; polyester resins; epoxy resins, catalysts, and adjuncts; coumarone-indene resin; petroleum hydrocarbon resin (cyclopentadiene type); terpene resins; urea-formaldehyde resins and their curing catalyst; triazine-formaldehyde resins and their curing catalyst; modifiers (for oils and alkyds, including polyesters); vinyl resinous substances (.polyvinyl chloride, polyvinyl acetate, polyvinyl alcohol, etc.); cellulosic materials (carboxymethylcellulose, cellulose acetate, ethylhydroxyethylcellulose, other cellulosic ethers); styrene polymers; polyethylene and its copolymers; acrylics and their copolymers; methyl methacrylate; ethyl methacrylate; waxes (paraffin type I, paraffin type II, polyethylene, sperm oil, bees, and spermaceti); melamine; polyamides; polylactic acid; polycaprolactone; Biopol® (a polyhydroxybutyrate-hydroxyvalerate copolymer); aliphatic-aromatic copolyestersi thermoplastic starch, either alone or blended with a hydrophobic polymer; soybean protein; other synthetic polymers including biodegradable polymers; and elastomers and mixtures thereof. Biopol® is manufactured by ICI in the United Kingdom. Appropriate inorganic coatings include sodium silicate, calcium carbonate, aluminum oxide, silicon oxide, kaolin, day, ceramic and mixtures thereof. The inorganic coatings may also be mixed with one or more of the organic coatings set forth above.

In some cases, it may be preferable for the coating to be elastomeric or deformable. Some coatings may also be used to strengthen places where the articles are severely bent. In such cases, a pliable, possibly elastomeric, coating may be preferred. A waterproof coating is desirable for articles intended to be in contact with water. If the articles are intended to come into contact with foodstuffs, the coating material will preferably comprise an FDA-approved coating.

Polymeric coatings such as polyethylene, aliphatic-aromatic copolyesters, polylactic acid, and thermoplastic starch blended with a hydrophobic polymer are useful in forming generally thin layers having low density. Such coatings may advantageously be applied in the form of a liquid or a laminating film. Polymeric coatings can also be utilized as an adhesive when heat sealed.

Waxes and wax blends, particularly petroleum and synthetic waxes, provide a barrier to moisture, oxygen, and some organic liquids, such as grease or oils. They also allow an article such as a container to be heat sealed. Petroleum waxes are a particularly useful group of waxes in food and beverage packaging and include paraffin waxes and microcrystalline waxes.

V. Summary

The present invention provides mold apparatus and systems for maintaining accurate X-Y orientation between the mold halves and which overcome other problems associated with prior art mold designs.

The present invention also provides mold apparatus and systems for molding starch: bound compositions that maintain a sufficient dimension variation tolerance and which avoid the problems associated with molding starch-bound articles having disparate wall thicknesses.

The present invention further provides mold apparatus and systems that can repetitively and reliably form foamed starch-bound articles while avoiding both under curing and over curing of the starch-based compositions used to manufacture such articles.

The present invention additionally provides mold apparatus and systems that consistently define a desired mold cavity and which resist dimensional fluctuations due to temperature variations through which the mold apparatus must cycle during the molding process.

The present invention yet provides mold apparatus and systems that significantly eliminate the necessity of making individual mold cavity adjustments on a regular basis.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A mold system for forming molded articles, comprising:
   (1) a mold press, the mold press comprising:
      (a) an array of female molds each having a shape; and
      (b) an array of male molds having a shape that is complimentary to the shape of a corresponding female mold, the male molds being oriented so as to be selectively mated with the female molds to thereby yield an array of resulting mold cavities corresponding to one or more desired shapes of the molded articles;

(2) a suction removal system that is selectively inserted and removed from between the mold arrays of the mold press when the mold arrays are separated, the suction removal system comprising:
  (a) a movable carriage that is selectively inserted and removed from between the mold arrays; and
  (b) an array of suction members attached to the moveable carriage and configured so as to remove the molded articles from the mold press upon deployment of the suction removal system; and (3) a deposit system configured so as to charge the mold press with molding material during deployment of the suction removal system to remove the molded articles from the mold press, the deposit system comprising at least one row of charging nozzles attached to the movable carriage through which molding material is introduced into at least one row of female molds.

2. A mold system as defined in claim 1, wherein the array of female molds comprises a two-dimensional array comprising a plurality of columns and rows of female molds.

3. A mold system as defined in claim 1, wherein the array of male molds comprises a two-dimensional array comprising a plurality of columns and rows of male molds.

4. A mold system as defined in claim 1, wherein the array of male molds remains substantially coplanar with the array of female molds when the mold arrays are separated.

5. A mold system as defined in claim 1, wherein the mold press further includes at least one of vent holes or a vent gap at or near an interface between each corresponding male and female mold.

6. A mold system as defined in claim 5, wherein the vent holes, vent gap or both provide for the escape of water vapor during formation of starch-based molded articles from an aqueous starch-based composition.

7. A mold system as defined in claim 1, further including a conveyor system that transports the molded articles from the mold press to another location for further processing.

8. A mold system as defined in claim 7, wherein the conveyor system includes a plurality of nests.

9. A mold system as defined in claim 1, wherein each suction member comprises a suction removal nozzle and a suction cup attached thereto.

10. A mold system as defined in claim 1, the mold press further comprising:
  at least one mold guide associated with each female mold; and
  at least one mold guide associated with each male mold and configured and oriented so as to mate with at least one corresponding mold guide associated with the corresponding female mold in order to ensure a desired alignment of each male and female mold half so as to yield a resulting mold cavity having a desired configuration.

11. A mold system as defied in claim 1, wherein the suction removal system comprises at least one row of suction members and wherein the deposit system comprises at least one row of charging nozzles that are substantially parallel to the suction members.

12. A mold system as defined in claim 1, wherein the mold press comprises two-dimensional arrays of male and female molds, each mold array having a plurality of columns and rows of molds, wherein the suction removal system comprises a two-dimensional array of suction members such that there is at least one suction member corresponding to each molded article formed by the mold press.

13. A mold system as defined in claim 12, wherein the suction removal system initially and simultaneously lifts all of the molded articles out and away from the female molds and then moves the molded articles from between the separated mold arrays of the mold press, wherein the deposit system charges the female molds with molding material as the suction removal system moves the molded articles from the mold press.

14. A mold system as defined in claim 13, wherein the female molds are charged with molding material one row at a time as the suction removal system moves the molded articles from the mold press.

15. A mold system for forming molded articles, comprising:
  (1) a mold press, the mold press comprising:
    (a) a two-dimensional array of female molds comprising a plurality of rows and columns of female molds, each female mold having a shape; and
    (b) a two-dimensional array of male molds comprising a plurality of rows and columns of male molds, each male mold having a shape that is complimentary to the shape of a corresponding female mold, the male molds being oriented so as to be selectively mated with the female molds to thereby yield an array of resulting mold cavities corresponding to one or more desired shapes of the molded articles,
    wherein the array of male molds remains substantially coplanar with the array of female molds during selective mating and separation of the mold arrays;
  (2) a suction removal system that is selectively inserted and removed from between the mold arrays of the mold press when the mold arrays are separated, the suction removal system comprising:
    (a) a movable carriage that is selectively inserted and removed from between the mold arrays and which remains substantially coplanar with the male and female mold arrays during deployment of the suction removal system; and
    (b) an array of suction removal nozzles attached to the moveable carriage and configured so as to remove the molded articles from the mold press upon deployment of the suction removal system; and
  (3) a depositing system configured so as to charge the mold press with molding material during deployment of the suction removal system to remove the molded articles from the mold press, the depositing system comprising at least one row of charging nozzles attached to the movable carriage through which molding material is introduced into at least one row of female molds as the suction removal system is removed from between the mold arrays of the mold press.

16. A mold system as defined in claim 15, wherein the suction removal system initially and simultaneously lifts all of the molded articles out and away from the female molds and then moves the molded articles from between the separated mold arrays of the mold press.

17. A mold system as defined in claim 15, wherein the mold press further includes at least one of vent holes or a vent gap at or near an interface between each corresponding male and female mold so as to provide for the escape of water vapor during formation of starch-based molded articles from an aqueous starch-based composition.

18. A mold system as defined in claim 15, further including a conveyor system that transports the molded articles from the mold press to another location for further processing.

19. A mold system for forming molded starch-based articles, comprising:
(1) a mold press, the mold press comprising:
  (a) an array of female molds, each having a shape;
  (b) an array of male molds, each having a shape that is complimentary to the shape of a corresponding female mold, the male molds being oriented so as to be selectively mated with the female molds to thereby yield an array of resulting mold cavities corresponding to one or more desired shapes of the molded articles; and
  (c) at least one of vent holes or a vent gap at or near an interface between each corresponding male and female mold so as to provide for the escape of water vapor during formation of starch-based molded articles from an aqueous starch-based composition;
(2) a suction removal system that is selectively inserted and removed from between the mold arrays of the mold press when the mold arrays are separated, the suction removal system comprising:
  (a) a movable carriage that is selectively inserted and removed from between the mold arrays; and
  (b) an array of suction members attached to the moveable carriage and configured so as to remove the molded starch-based articles from the mold press upon deployment of the suction removal system;
(3) a deposit system configured so as to charge the mold press with the aqueous starch-based composition during deployment of the suction removal system to remove the molded starch-based articles from the mold press, the deposit system comprising at least one row of charging nozzles attached to the movable carriage through which molding material is introduced into at least one row of female molds as the suction removal system is removed from between the mold arrays of the mold press; and
(4) a conveyor system that transports the molded articles from the mold press to another location for further processing, the conveyor system comprising a plurality of nests.

20. A mold system as defined in claim 19, wherein the mold press comprises two-dimensional arrays of male and female molds, each mold array having a plurality of columns and rows of molds, wherein the suction removal system comprises a two-dimensional array of suction members such that there is at least one suction member corresponding to each molded article formed by the mold press.

* * * * *

UNITED STATES PATENT AND TRADEMARK OFFICE
CERTIFICATE OF CORRECTION

PATENT NO.   : 6,494,704 B1  Page 1 of 1
DATED        : December 17, 2002
INVENTOR(S)  : Per Just Andersen et al.

It is certified that error appears in the above-identified patent and that said Letters Patent is hereby corrected as shown below:

Column 1,
Line 40, after "Additionally," and before "time" insert -- although paper and wood containers are produced from renewable resources, the passage of --

Column 4,
Line 33, after "molds" change "in" to -- is --
Line 39, after "hinged" change "claim-shell" to -- clam-shell --
Line 40, before "article" change "multiz piece" to -- multi-piece --

Column 11,
Line 15, before "articles" change "molded" to -- demolded --

Column 15,
Line 13, after "sand," change "gavel" to -- gravel --

Column 17,
Line 56, after "substances" change "(.polyvinyl" to -- (polyvinyl --

Signed and Sealed this

Twentieth Day of May, 2003

JAMES E. ROGAN
*Director of the United States Patent and Trademark Office*